(12) United States Patent
Schrödel et al.

(10) Patent No.: US 10,662,351 B2
(45) Date of Patent: May 26, 2020

(54) STICK-TYPE HOT-MELT ADHESIVE BODY FOR HOT-MELT GLUE GUNS

(71) Applicant: Jowat SE, Detmold (DE)

(72) Inventors: Jürgen Schrödel, Detmold (DE); Markus Kronshage, Detmold (DE); Ulrich Schmidt, Detmold (DE)

(73) Assignee: Jowat SE, Detmold (DE)

( * ) Notice: Subject to any disclaimer, the term of this patent is extended or adjusted under 35 U.S.C. 154(b) by 106 days.

(21) Appl. No.: 16/093,691

(22) PCT Filed: Feb. 9, 2017

(86) PCT No.: PCT/EP2017/052833
§ 371 (c)(1),
(2) Date: Oct. 15, 2018

(87) PCT Pub. No.: WO2017/178128
PCT Pub. Date: Oct. 19, 2017

(65) Prior Publication Data
US 2019/0136098 A1 May 9, 2019

(30) Foreign Application Priority Data

Apr. 15, 2016 (EP) .................................... 16000854
May 19, 2016 (EP) .................................... 16170301

(51) Int. Cl.
| | |
|---|---|
| *C09J 9/00* | (2006.01) |
| *C09J 11/04* | (2006.01) |
| *C09J 123/26* | (2006.01) |
| *C09J 133/14* | (2006.01) |
| *C09J 175/04* | (2006.01) |
| *B05C 17/005* | (2006.01) |
| *B05B 15/50* | (2018.01) |

(52) U.S. Cl.
CPC ......... *C09J 9/005* (2013.01); *B05C 17/00526* (2013.01); *C09J 11/04* (2013.01); *C09J 123/26* (2013.01); *C09J 133/14* (2013.01); *C09J 175/04* (2013.01); *B05B 15/50* (2018.02)

(58) Field of Classification Search
CPC .............. B05C 17/00526; B05C 15/50; B05C 17/0053; B05C 17/00533; B05C 17/00523; B05C 17/00553; B05C 17/00563; B05C 17/00556; C09J 9/005; C09J 11/04; C09J 123/26; C09J 133/14; C09J 175/04; C09J 9/00; C09J 11/06; C09J 11/08; C09J 123/22; C09J 123/18; C09J 123/28; C09J 133/04; B05B 15/50
See application file for complete search history.

(56) References Cited

U.S. PATENT DOCUMENTS 6,648,026 B2 * 11/2003 Look ...................... A45D 40/04
141/100
6,840,403 B2 * 1/2005 Girouard .................. B44D 3/22
222/1

* cited by examiner

*Primary Examiner* — David J Walczak
(74) *Attorney, Agent, or Firm* — Edward E. Sowers; Brannon Sowers & Cracraft, PC

(57) ABSTRACT

A stick-type hot-melt adhesive body for use in hot-melt glue guns, the hot-melt adhesive body having at least one first section containing at least one reactive adhesive and at least one second section containing at least one cleaning agent (purging agent), the first section and/or the reactive hot-melt adhesive and the second section and/or the cleaning agent differing optically and/or visually from one another, in particular being of different colors.

18 Claims, 3 Drawing Sheets

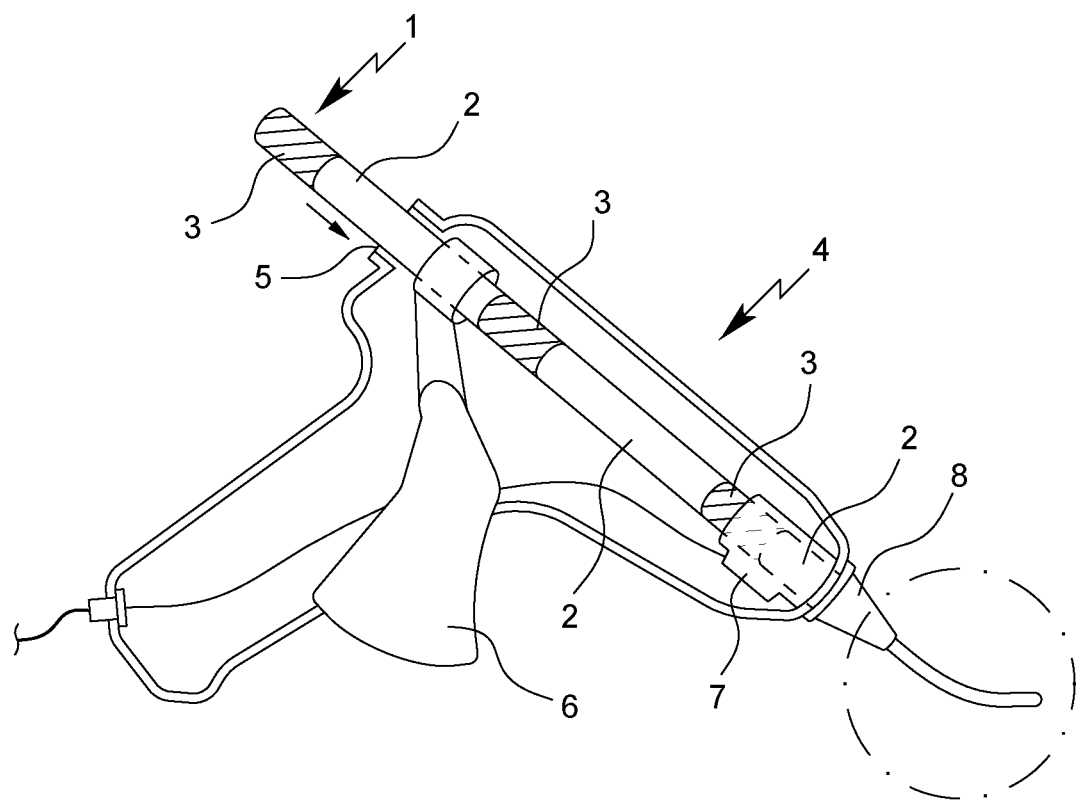
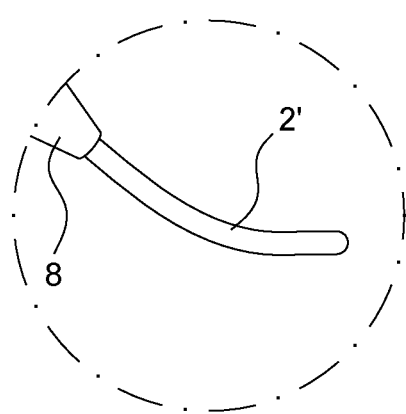
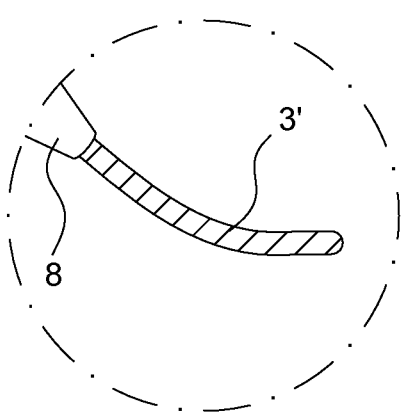
Fig. 3A  Fig. 3B

STICK-TYPE HOT-MELT ADHESIVE BODY FOR HOT-MELT GLUE GUNS

CROSS-REFERENCES TO RELATED APPLICATIONS

This application is a National Stage filing of International Application PCT/EP 2017/052833 (WO 2017/178128) entitled Stick-Type Hot-Melt Adhesive Body for Hot-Melt Glue Guns, claiming priority to European Application Nos. EP 16 000 854.6 filed Apr. 15, 2016 and EP 16 170 301.2 of filed May 19, 2016. The subject application claims priority to PCT/EP 2017/052833, to EP 16 000 854.6 and to EP 16 170 301.2 and incorporates all by reference herein, in their entirety.

BACKGROUND OF THE INVENTION

The present invention relates to the technical field of hotmelt adhesives and their use in corresponding assembly or bonding procedures, and also of the hotmelt adhesive discharge apparatuses employed in this context, especially in the form of hotmelt or hot glue guns.

The present invention especially relates to a stick-type (stick-shaped, rod-formed) hotmelt adhesive body, especially hotmelt adhesive stick, based on a reactive hotmelt adhesive and on a cleaning or purging agent, the hotmelt adhesive body being preferably in cylindrical form and being suitable especially for use in hotmelt glue guns.

The present invention likewise relates to a method for producing the hotmelt adhesive body, especially hotmelt adhesive stick, according to the invention, and to the adhesive body as such that is obtainable by the method.

The present invention relates, moreover, to a hotmelt adhesive discharge apparatus (hotmelt adhesive processing apparatus), especially in the form of a hotmelt or hot glue gun, which comprises the hotmelt adhesive body, especially hotmelt adhesive stick, of the invention, and also to a kit based on a hotmelt adhesive discharge apparatus, especially hotmelt or hot glue gun, on the one hand and on a hotmelt adhesive body, especially hotmelt adhesive stick, according to the invention, on the other hand.

The present invention relates, furthermore, to a pack unit or container which comprises at least one hotmelt adhesive body, especially hotmelt adhesive stick, of the invention.

The present invention, furthermore, relates to a use of the hotmelt adhesive body, especially hotmelt adhesive stick, according to the invention for and/or in assembly and/or bonding processes or the like.

The present invention additionally relates to a use of a coloring component or colorant for identifying or providing a visual or optical difference between sections on which the hotmelt adhesive body according to the invention is based, with the respective sections comprising a reactive hotmelt adhesive on the one hand or else a cleaning or purging agent on the other hand.

Lastly, the present invention also relates to the method for identifying or providing a visual or optical difference between the aforesaid sections of the hotmelt adhesive body according to the invention on the basis firstly of the reactive hotmelt adhesive and secondly of the cleaning agent.

Hotmelt adhesives, also referred to synonymously as hot-applied adhesives, hot glues or hotmelts, are in general products which are solvent-free and are solid at room temperature, which on heating or in the hot state take on a fluid or liquid state, so that on this basis application may be made to a bond area. On cooling, with an associated consolidation of the hotmelt adhesive, a solid and permanent (adhesive) bond is then developed.

The hotmelt adhesives on which this system is based are provided generally in the form of stick-type hotmelt adhesive bodies, also referred to synonymously as hotmelt adhesive sticks or hotmelt glue cartridges, which are intended in particular for processing in corresponding hotmelt adhesive discharge apparatuses, such as hotmelt or hot glue guns. In this connection, the hotmelt adhesive bodies generally have a cylindrical form with a defined cylinder height (i.e., with defined length of the hotmelt adhesive body) and with a defined, more particularly circular, base area (i.e., with defined diameter of the hotmelt adhesive body).

Hotmelt adhesives are generally associated with the advantage of rapid processing in conjunction with low material price, and also allow bonding of a very wide variety of materials and substrates. Also of advantage in this context is that the hotmelt adhesives used allow any unevennesses in material surfaces to which bonding is to take place to be compensated, with the resulting bonded joint or bonded layer also exhibiting a certain elasticity.

Against this background as well, hotmelt adhesives are used generally in numerous industrial applications, such as, for example, in the packaging industry and also in the automotive, furniture, and woodworking industries, employing corresponding laminating techniques, for example. In the electrical engineering sector as well, hotmelt adhesives find far-reaching use, as for example for mechanical stabilization, insulation, and bonding of corresponding components. Furthermore, hotmelt adhesives are often used in the domestic sphere or home hobby and craft sector, but also in floristry and in the packaging industry.

Against the background of the extensive use and of the numerous applications of hotmelt adhesives in both industrial and domestic spheres, as well, there is a great demand in the art for further optimization in relation to the adhesive systems employed accordingly.

Generally speaking, in the art, hotmelt adhesives are processed or applied using corresponding discharge apparatuses, such as, in particular, hotmelt or hot glue guns. The product portfolio available for hotmelt glue guns is divided into various fields of application, according to the profile of technical requirements. Tank glue guns without compressed air, with compressed air, and tank guns for cartridges are prevalent.

Also established in particular, because of their favorable price/performance tradeoff and their ease of handling, are hotmelt or hot glue guns for hot glue sticks. Here, generally, a hotmelt adhesive in stick or cylinder form is introduced on the rear side of the hotmelt glue gun, and in the interior of the hotmelt glue gun it is heated by a heating or melting facility, which in particular is electrically operated, and is thereby melted, or converted into a fluid or liquid state. Continued mechanical infeed of the still-solid hotmelt adhesive into the heating or melting facility causes the fluidized hotmelt adhesive present there to be moved on accordingly and discharged through a discharge facility, more particularly an adhesive nozzle or the like, which may be part of the heating or melting facility, and it is applied to an article to be bonded. The transport of the hotmelt adhesive, especially in stick form, is ensured here generally by a corresponding transport mechanism, which in particular is manually actuated.

In this connection, WO 2008/101455 A2, or DE 10 2007 008 722 A1, which belongs to the same patent family, relates to a hot glue or fast-bond gun having a gunlike housing, the construction of the gun being such that the hotmelt adhesive to be processed can be guided through the hotmelt glue gun at variable speed; in this connection, the heating power can be adapted for melting the hotmelt adhesive.

One of the disadvantages of the hotmelt glue guns generally used in the processing of hotmelt adhesives, however, is that after application or processing of the hotmelt adhesive, adhesive which has already melted remains, particularly in the region of the heating or melting facility and of the discharge apparatus or adhesive nozzle, where it hardens. This is a problem particularly in view of the reactive hotmelt adhesives, described hereinafter, since these adhesives, by virtue of their chemical postcrosslinking and also of the development of chemical adhesive bonds, undergo irreversible hardening, so to speak, and do not form dissoluble adhesive bonds even when exposed to heat. A possible consequence of this is that hotmelt glue guns which are not freed from residual hotmelt adhesives or cleaned immediately after use become unusable, or before renewed operation must be taken apart and cleaned, which is costly and inconvenient.

The art is aware in general of two kinds of hotmelt adhesives, namely those referred to as nonreactive hotmelt adhesives, on the one hand, and the reactive hotmelt adhesives, on the other:

Frequently used in the prior art, accordingly, are nonreactive hotmelt adhesives, of the kind based, for example, on ethylene-vinyl acetate (EVA) and polyesters (PES). Nonreactive hotmelt adhesives of this kind are used for a multiplicity of standard applications on the basis as well of their attractive price/performance tradeoff. The chemical basis of adhesives in stick form is therefore ethylene-vinyl acetate (EVA) in particular. To lesser an extent, alongside the use of polyesters (PES), there are also hot glue sticks available that are based on polyolefin (PO) or polyamide (PA). The aforementioned sticks are fundamentally homogeneous in terms of their chemical composition.

The fields of application for EVA sticks, for example, are to be found primarily in the sphere of floristry and the packaging industry. The polyamides are employed in the automobile and electrical industry sectors.

Nonreactive hotmelt adhesives are notable in particular for short open times and setting times. Here, a central bonding principle of nonreactive hotmelt adhesives is that the actual bonding is essentially physical, resulting from the consolidation of the adhesive that is present on the cooling of the discharged hotmelt adhesive. Consequently, the adhesive systems in question that are based on nonreactive hotmelt adhesives do all in all enjoy very good handling properties, but do not always enjoy ideal bonding properties, because of the purely physical bonding.

With regard to the nonreactive hotmelt adhesives, it should also be said in this respect that after consolidation has taken place, they can in principle be melted again; this indeed facilitates the ease of handling in hotmelt glue guns, since these guns, even during relatively long pauses in operation, do not, so to speak, become "clogged", but it is disadvantageous in respect of the bonding properties as such, since adhesive bonds that have developed are occasionally not sufficiently heat-stable. As a result, therefore, the nonreactive hotmelt adhesives in question are not always sufficiently heat-resistant.

In this connection, nonreactive hotmelt adhesives also sometimes have the disadvantage that their mechanical dimensional integrity is low and that they tend to exhibit creep even under relatively low static loading and at relatively high ambient temperature. For this reason as well, nonreactive hotmelt adhesives have only a small usage range in applications particularly at above room temperature. Moreover, especially after they have been processed, nonreactive hotmelt adhesives are occasionally not always adequately resistant in chemical terms.

As well as the nonreactive hotmelt adhesives referred to above, there are also reactive hotmelt adhesives known in principle in the prior art, as formed, for example, on the basis of reactive polyurethanes or, for example, silane-modified polyolefins.

A particular feature of the reactive hotmelt adhesives is that they possess chemically reactive functional groups which, in particular during and after processing or application, under the influence, for example, of heat, radiation or moisture, lead to (post)crosslinking and/or, further to the physical bonding properties, to the development of chemical adhesive bonds.

In the processing or application of reactive hotmelt adhesives, therefore, following application to articles to be bonded, there is not only a physical setting but also, in conjunction therewith and/or subsequently, a further chemical reaction to form high molecular mass polymers with high cohesion, and/or to form additional adhesive bonds due to chemical reactions with the surface of the articles to be bonded. In this way, with reactive hotmelt adhesives, it is possible to achieve very good bonding properties, high temperature stabilities in conjunction with good low-temperature flexibility, and also high resistances to a multiplicity of chemicals. Reactive hotmelt adhesives therefore have not only the advantages of the aforesaid quick-setting nonreactive hotmelt adhesives but also those associated with the chemical crosslinking and formation of chemical adhesive bonds. In particular, reactive hotmelt adhesives, owing particularly to the postcrosslinking, exhibit, so to speak, initial physical curing and, equally, rapid processes of processing without long-drawn-out drying phases.

Reactive hotmelt adhesives, in particular, have good bonding properties and high temperature resistances insofar as, owing to the chemical postcrosslinking and the development of chemical adhesive bonds, a reactive hotmelt adhesive cured accordingly can no longer be melted by exposure to heat, or the adhesive bonds formed cannot be parted by heating.

Against this background as well, however, in their storage and in their processing especially in hotmelt glue guns, reactive hotmelt adhesives are problematic, since, on the one hand, excessive contact with, for example, (atmospheric) moisture or (ambient) radiation leads to unwanted, premature reaction of the chemically reactive groups of the hotmelt adhesive. On the other hand, in the case of processing in hotmelt glue guns, reactive hotmelt adhesive, previously melted, and remaining in particular in the region of the heating or melting facility and also of the discharge facility, especially adhesive nozzle, may undergo (thermally) irreversible curing in the event of a pause in operation or standstill and, in so doing, may enter into chemical adhesive bonds with the inside surfaces of the hotmelt glue gun that are in contact with the reactive hotmelt glue, such bonds being impossible to part even by subsequent heating; this results, accordingly, in unwanted clogging of the hotmelt glue gun, which cannot be eliminated even by heating.

In terms of their processing properties in corresponding hotmelt adhesive application apparatuses, such as hotmelt glue guns or the like, the reactive hotmelt adhesives described above are disadvantageous, since after corresponding use of the relevant equipment and after curing of the adhesives, they cannot be readily removed from this equipment.

As a result, therefore, reactive hotmelt adhesives do not always have the desired storage and processing properties, particularly with regard to their application in hotmelt glue guns.

BRIEF SUMMARY OF THE INVENTION

Against this technical background, therefore, one object of the present invention is to provide a special stick-type hotmelt adhesive body suitable for processing in hotmelt glue guns, based on a reactive hotmelt adhesive, and also to provide a method for producing the hotmelt adhesive body according to the invention, wherein the disadvantages of the prior art as outlined above, especially with regard to the processing properties of reactive hotmelt adhesives in hotmelt glue guns, are avoided or else at least attenuated.

In particular, a further object of the present invention is to provide a corresponding hotmelt adhesive body, based on a reactive hotmelt adhesive, which exhibits improved application-specific or processing-specific properties particularly in the context of use in hotmelt glue guns, the intention here being to prevent irreversible, post-processing clogging or blocking in particular of constituents of the hotmelt glue gun that comprise the reactive hotmelt adhesive in fluid form in the operating state, such as, for example, the heating or melting facility and also the discharge facility, especially adhesive nozzle.

In this context, yet a further object of the present invention is to provide further technical measures which, particularly in the context of the use or processing of the hotmelt adhesive bodies provided in accordance with the invention, enable reliable, processing-specific monitoring or verification, by the user, of the measures provided in accordance with the invention for purposes of preventing irreversible clogging or blocking of hotmelt glue guns.

The object on which the present invention is based is achieved—according to a first aspect of the present invention—by a stick-type hotmelt adhesive body, especially hotmelt adhesive stick, preferably in cylindrical form. Further, advantageous configurations of the stick-type hotmelt adhesive body of the invention are similarly provided.

A further subject of the present invention—according to a second aspect of the invention—is the method of the invention for producing the hotmelt adhesive body according to the invention. Further, advantageous configurations of the method of the invention are discussed herein.

A further subject of the present invention—according to a third aspect of the invention—is also, in this context, the hotmelt adhesive body of the invention, which is obtainable by the method according to the invention.

Yet a further subject of the present invention—according to a fourth aspect of the invention—is, moreover, the hotmelt adhesive discharge apparatus (hotmelt adhesive processing apparatus) relating to the hotmelt adhesive discharge apparatus. Further, advantageous configurations of the hotmelt adhesive discharge apparatus of the invention are provided.

The present invention, furthermore, relates—according to a fifth aspect of the invention—to the kit of the invention as well, which comprises at least one hotmelt adhesive discharge apparatus and also at least one hotmelt adhesive body according to the invention.

A further subject of the present invention, moreover—according to a sixth aspect of the invention—is the pack unit of the invention or the container according to the invention described herein.

Yet a further subject of the present invention—according to a seventh aspect of the invention—is, moreover, the use of the hotmelt adhesive body according to the invention for joining or bonding processes, or for the joining and/or bonding of articles or components.

An even further subject of the present invention—according to an eighth aspect of the invention—is, moreover, the use in accordance with the invention of at least one coloring component or colorant for identifying or providing a visual or optical difference between sections forming the hotmelt adhesive body according to the invention.

Lastly, the present invention—according to a ninth aspect of the invention—relates to the method for identifying or providing a visual or optical difference between sections forming the hotmelt adhesive body, according to the method of the invention.

It will be readily appreciated that in the following description of the present invention, such embodiments, configurations, advantages, examples or the like which in the following—in order to avoid unnecessary repetitions—are explained with respect to only one aspect of the invention of course also apply correspondingly to the other aspects of the invention, without this having to be expressly stated.

Moreover, it will be readily appreciated that in indications of values, numbers and ranges in the text below, the respective values, numbers and ranges indicated should not be given a limiting interpretation; it is self-evident to the skilled person that deviations can be made from the ranges or data indicated, in individual cases or relevant to particular applications, without departing from the scope of the present invention.

Moreover, it is also the case that in principle, all of the values or parameters or the like indicated below can be arrived at or determined by normalized or standardized or explicitly indicated methods of determination, or else, otherwise, by methods of measurement or determination that are familiar per se to the person skilled in this art. Unless otherwise indicated, the basic values or parameters are determined under standard conditions (i.e., in particular at a temperature of 20° C. and/or under a pressure of 1 013.25 hPa or 1.01325 bar).

Moreover, it should be borne in mind, for all relative or percentage amounts, especially weight-based amounts, indicated below, that these indications are to be selected and/or combined by the skilled person, in the context of the present invention, in such a manner that they always amount in total—including, where appropriate, further components or ingredients, especially as defined hereinafter—to 100% or 100 wt. %. This, however, is self-evident to the skilled person.

This having been established, the present invention is described and elucidated in more detail below, specifically also by means of drawings or figures illustrating preferred embodiments or implementation examples.

BRIEF DESCRIPTION OF THE DRAWINGS

FIG. 3 shows a schematic representation of a hotmelt adhesive discharge apparatus of the invention, present in particular in the form of a hotmelt glue gun with inserted hotmelt adhesive body according to the invention, where FIG. 3A shows a first operating or employment state of the hotmelt adhesive discharge apparatus with the discharge of the hotmelt adhesive, and FIG. 3B shows a further operating or employment state of the hotmelt adhesive discharge apparatus of the invention with the discharge of the cleaning agent.

DETAILED DESCRIPTION OF THE INVENTION

Figure 1A:
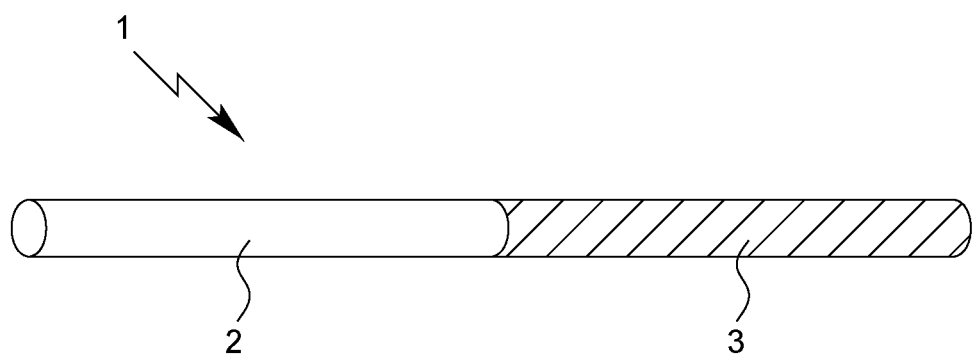
FIG. 1A shows a schematic plan view of a cylindrically shaped hotmelt adhesive body of the invention, present in the form of a hotmelt adhesive stick.

A subject of the present invention—according to a first aspect of the present invention—is therefore a stick-type hotmelt adhesive body, especially hotmelt adhesive stick, preferably in cylindrical form, especially for use in hotmelt glue guns, wherein the hotmelt adhesive body comprises at least one first section, comprising or consisting of at least one reactive hotmelt adhesive, and at least one second section, comprising or consisting of at least one cleaning agent (purging agent), wherein the first section and/or the reactive hotmelt adhesive, on the one hand, and the second section and/or the cleaning agent, on the other hand, are configured to be optically and/or visually different from one another, especially different in color from one another.

The present invention is therefore directed to a specific stick-type hotmelt adhesive body or hotmelt adhesive stick which is preferably in cylindrical form and which is suitable for processing with or in hotmelt adhesive guns, where the stick-type hotmelt adhesive body according to the invention comprises at least one reactive hotmelt adhesive in combination with a cleaning agent which is spatially separate from the reactive hotmelt adhesive. In accordance with the invention, therefore, the stick-type hotmelt adhesive body or hotmelt adhesive stick is a reactive hotmelt adhesive system ready for application for processing in hotmelt adhesive guns, for which purpose, in particular, one-component reactive hotmelt adhesive systems are used.

An approach of the present invention here is to be seen in the fact that the stick-type hotmelt adhesive body of the invention, in purposive combination, comprises or is formed by discrete or mutually different sections, with the respective sections comprising either the reactive hotmelt adhesive system in question (hotmelt adhesive section) or a specific cleaning agent, also referred to synonymously as purging agent (cleaning agent section). In the context of this approach, the relevant sections, as observed further in detail hereinafter, are optically or visually different from one another or distinguishable from one another in their configuration.

Generally speaking, the sections in question are disposed along the longitudinal axis of the hotmelt adhesive body according to the invention, which is present especially in cylindrical form, and so in the application state or utilization state of the hotmelt adhesive body, especially in hotmelt glue guns, the sections are subjected to corresponding processing consecutively, with the result, so to speak, in the processing of the parent components, that the reactive hotmelt adhesive on the one hand and the cleaning or purging agent on the other can be processed or discharged one after another in the form of the respective melts. Here, by the processing of cleaning agent sections, the hotmelt glue gun, especially the heating or melting facility and also the discharge facility, is freed of the reactive hotmelt glue or cleaned, thereby counteracting permanent clogging of the hotmelt glue gun even on long standstill or between the respective operating sections.

In the application or processing of the hotmelt adhesive body of the invention, especially the adhesive stick, therefore, there is consecutively either discharge of the reactive hotmelt adhesive, on the one hand, or else of the cleaning or purging agent, on the other, and so, during the processing of the hotmelt adhesive body, there is either a bonding operation or a purging operation, with the purging operation leading to corresponding cleaning of the hotmelt glue gun. Because of the distinguishability, the user is able to follow these operations at any time.

In this context, a central function of the cleaning or purging agent used in accordance with the invention is to be seen in the fact that on melting thereof, melted reactive hotmelt adhesive present beforehand in the melting facility and/or the discharge facility of the hotmelt glue gun is removed and is replaced with the cleaning agent, which in general is remeltable, allowing the cleaning agent to remain in the hotmelt glue gun between the operating sections and/or during the storage of said gun. This ensures, in accordance with the invention, that the hotmelt glue gun is free from hotmelt adhesive which is no longer meltable after crosslinking, and therefore retains its usefulness or serviceability, in particular since irreversible clogging of the apparatus is prevented.

In this context, a central idea of the present invention, as indicated above, is that the sections of the hotmelt adhesive body of the invention (i.e., section with reactive hotmelt adhesive, on the one hand, and section with cleaning or purging agent, on the other) are optically or visually different from one another in their configuration, something which can be ensured in particular, in accordance with the invention, by different coloration of the sections in question.

As a result of the optical or visual differentiation, which as well by different coloring can also be ensured, for example, by a different translucency or opacity and/or by different optical densities on the part of the sections in question, preferably by way of different coloring or coloration, it is possible for the user to assess directly which material (i.e. hotmelt adhesive on the one hand and cleaning or purging agent on the other) is being discharged from the hotmelt adhesive discharge apparatus, especially hotmelt glue gun, so that the material discharged can be assessed directly on the basis of the melt delivered from the apparatus. On this basis, therefore, the user is able to exert targeted monitoring or mutual harmonization between bonding processes and cleaning or purging processes. Accordingly, the user is able to bring the hotmelt glue gun correspondingly into a storable condition, allowing the user to use the hotmelt glue gun again at any time without costly and inconvenient cleaning.

Through the individual arrangement and design in terms of size and/or volume, and the selection of the number of respective sections in the form of the reactive hotmelt adhesive on the one hand and of the cleaning or purging agent on the other, it is possible for the hotmelt adhesive bodies of the invention, particularly against the background of the respective end application or end use, to be tailored or individually adapted. This is also the case insofar as, in accordance with the invention, as stated further later on, specific reactive hotmelt adhesives on the one hand and, in turn, specific cleaning agents on the other hand can be used and can be deliberately combined in order thereby to allow individual tailoring of the cleaning or purging properties in relation, for example, to the chemical properties and/or the bonding properties of the adhesive used.

All in all, therefore, the approach according to the invention is attended by numerous advantages, as again summarized and expanded below:

Through the provision of a hotmelt adhesive body based on a reactive hotmelt adhesive, the invention provides a powerful adhesive system wherein the advantages of nonreactive hotmelt adhesives, particularly with regard to outstanding processing properties (e.g., short cure times and the like), are united with the very good bonding performances of reactive hotmelt adhesive systems, owing in particular to the postcrosslinking and/or the development of chemical adhesive bonds.

At the same time, the disadvantages occasionally associated with reactive hotmelt adhesive systems are overcome within the present invention: hence, through the deliberate combination of the reactive hotmelt adhesive with a cleaning agent, the application thereof as part of processing is sustainedly improved, particularly with regard to the prevention of sometimes permanent clogging of the relevant application apparatuses, particularly hotmelt adhesive guns. Within the present invention, therefore, success has been achieved, entirely surprisingly, in terms of the reactive hotmelt adhesives used, in uniting the diametral properties of outstanding bonding performance on the one hand and improved technical application aspects on the other hand, in one and the same material, with the handling being critically improved through the capacity for optical differentiation.

In this connection, through the deliberate measure whereby the sections on which the hotmelt adhesive body is based, with the reactive hotmelt adhesive on the one hand and the cleaning agent on the other, are of a design optically different from one another, especially different in color from one another, it is ensured within the present invention that in the course of the processing it is possible at any time to see which material is being discharged from the hotmelt glue gun.

On this basis, therefore, it is very simple for the user or processor to prepare or set up the hotmelt glue gun used for a standstill, since composition is discharged only until the relevant cleaning or purging agent is discharged at the tip or nozzle of the hotmelt glue gun, something which is simple to perceive visually or optically. Fundamentally, therefore small amounts of cleaning agent are sufficient, and so the hotmelt adhesive bodies of the invention are able overall to comprise a high fraction of reactive hotmelt adhesive.

In this connection, therefore, there is also no need for costly and inconvenient dismantling and cleaning of the guns or for separate introduction of cleaning or purging agent, thereby sustainedly reducing the cost and complexity of maintenance.

Correspondingly, the hotmelt glue gun used can be operated without great cost and complexity, since, again, composition is discharged only until the reactive hotmelt adhesive is discharged at the nozzle of the hotmelt glue gun, which again can be perceived directly by optical or visual means. Accordingly, the operation and therefore the bonding process can be resumed as soon as the visually or optically different or different-colored reactive hotmelt adhesive appears at the nozzle tip, this also being associated with optimized consumption of material.

As set out in more detail below, the cleaning or purging agent comprises, in particular, a nonreactive material or a material which is compatible with the reactive hotmelt adhesive, in the form of a thermoplastic or nonreactive hotmelt adhesive, so that the cleaning or purging agent can be melted again at any time, resulting in prevention of the clogging of the application apparatus or hotmelt glue gun.

Through the purposive combination of a reactive hotmelt adhesive—more particularly a one-component reactive hotmelt adhesive—with a cleaning or purging agent—more particularly a thermoplastic cleaning or purging agent—as indicated above, therefore, a sustained improvement is achieved in terms of processing with hotmelt adhesive guns, relative to the prior art, on the basis of the hotmelt adhesive body—more particularly cylindrical hotmelt adhesive body—according to the invention.

As indicated above, therefore, a central idea of the present invention is to design the first section of the hotmelt adhesive body, with the reactive hotmelt adhesive, and/or the reactive hotmelt adhesive as such, and also the second section likewise of the hotmelt adhesive body of the invention, or the cleaning agent as such, so as to be optically different from one another:

In this connection, the invention envisages in particular that the first section and/or the reactive hotmelt adhesive, on the one hand, and the second section and/or the cleaning agent, on the other hand, have colors different from one another and/or light transmissibilities (translucencies) different from one another, preferably colors different from one another. By this means it is possible to ensure exact optical or visual differentiation of the components in question, especially also when they are discharged in the melted state from a corresponding hotmelt adhesive discharge apparatus, such as a hotmelt glue gun. Correspondingly, the user or applicator receives at any time direct visual or optical information as to which material is being discharged from the hotmelt glue gun at application.

According to one embodiment of the invention, it is possible in this connection that the first section and/or the reactive hotmelt adhesive is configured to be at least substantially colorless. In this regard, the first section and/or the reactive hotmelt adhesive may comprise at least substantially no coloring ingredient (colorant), especially no additional coloring ingredient.

In accordance with the invention, moreover, it is possible that the second section and/or the cleaning agent is configured to be colored. In this regard, the second section and/or the cleaning agent may comprise at least one coloring ingredient (colorant).

In accordance with the invention, however, it may also be the case that the second section and/or the cleaning agent is colorless and/or comprises no corresponding coloring ingredient (colorant), whereas the first section or the reactive hotmelt adhesive is made colored correspondingly, in particular by addition of a coloring ingredient or colorant.

For further technical measures for designing the first section and second section, respectively, for ensuring the optical difference envisaged in accordance with the invention, reference may be made to the following observations as well.

In accordance with the invention, it is the case in particular that the optical difference, especially the color difference, is at least substantially retained in the melted state, especially in the melt and/or during employment and/or processing, of the reactive hotmelt adhesive on the one hand and of the cleaning agent on the other hand. This enables corresponding differentiation or assessment of which material is being discharged from the hotmelt glue gun, especially in the form of the melt or in the fluid state.

In this context, the present invention provides in particular that the optical difference, especially the color difference, is perceptible by the user, especially visually and/or optically perceptible, during the employment and/or processing of the hotmelt adhesive body preferably by means of a hotmelt glue gun, especially during and/or from the discharge and/or the application of the reactive hotmelt adhesive on the one hand and of the cleaning agent on the other hand, especially in the form of the respective melt. The user or processor therefore receives information at any time during the application or processing as to which material specifically is being discharged from the hotmelt glue gun, thus permitting a direct conclusion to be drawn about whether, correspondingly, a bonding process, on the one hand, and or a cleaning process, on the other hand, is being carried out.

As far as the physical design or shaping of the hotmelt adhesive body of the invention is concerned, it is here in particular a cylindrical stick with corresponding base area and height (i.e. length of the hotmelt adhesive body). In particular, the hotmelt adhesive bodies, more particularly cylindrical hotmelt adhesive bodies, according to the invention have an at least substantially (circularly) round cross section.

In general, the first and second sections that form the hotmelt adhesive body according to the invention are arranged along the longitudinal axis of the hotmelt adhesive body according to the invention, especially where the sections in question form the hotmelt adhesive body according to the invention correspondingly.

In accordance with the invention, in particular, the first section and the second section each comprise a cylindrical shape.

It is further preferred in accordance with the invention if the first section and the second section comprise at least substantially identical base areas and/or at least substantially identical diameters. In particular, the respective base areas are the same in shape and/or area, more particularly in shape and in area.

Furthermore, the invention provides in particular that the first section and the second section form the hotmelt adhesive body according to the invention in the region of their respective extent and/or positioning present within the hotmelt adhesive body. In this connection, therefore, the hotmelt adhesive body according to the invention is formed in its entirety, correspondingly, by the overall arrangement or entirety of the constituent sections.

According to one embodiment of the invention, it may be the case that the first section forms a first end of the hotmelt adhesive body and the second section forms a second end of the hotmelt adhesive body. Provision is made in particular in accordance with the invention, accordingly, for a first section or the reactive hotmelt adhesive to be arranged at one end of the hotmelt adhesive body and for a second section or the cleaning agent to be arranged at the other end. Accordingly, in the context of the use or processing, it is possible, for example, for the reactive hotmelt adhesive to be processed first, followed by downstream discharge of the cleaning agent particularly for purposes of rinsing or cleaning the relevant hotmelt glue gun. For example, the hotmelt adhesive body according to the invention may comprise exactly one first section and one second section (arrangement: first section/second section; for example, with a length design or volume design as follows: ⅔ first section/⅓ second section).

In accordance with the invention, however, it is also possible for both ends of the hotmelt adhesive body according to the invention to be formed in each case by a first section or else by a second section, more particularly by a second section in each case. For the embodiment of the invention whereby both ends are formed by a second section or the cleaning agent, this means that in the application or use, there is initially purging or cleaning of the hotmelt glue gun, followed by discharge of the reactive hotmelt adhesive, and followed in turn by final cleaning or purging of the hotmelt glue gun. In this connection, in one advantageous version of the present invention, in particular, a hotmelt adhesive body is provided wherein both ends are each formed by a second section, with the second sections flanking a first section on either side (arrangement: second section/first section/second section; for example, with a length design or volume design as follows: ¼ second section/²/₄ first section/¼ second section).

According to an embodiment particularly preferred in accordance with the invention, the first section and the second section are connected to one another, in particular permanently connected or bonded to one another, at the base areas, especially cylinder base areas, that are disposed relative to one another in each case, especially that are opposite one another. Accordingly, in accordance with the invention, a one-piece hotmelt adhesive body is provided that comprises or consists of the sections connected in each case.

Moreover, in a preferred way, the first section and the second section are each disposed along the longitudinal axis of the hotmelt adhesive body, especially such that the longitudinal axis of the first section and the longitudinal axis of the second section lie on the longitudinal axis of the hotmelt adhesive body formed by the respective sections.

In accordance with the invention, it may generally be the case that the hotmelt adhesive body comprises an identical number of first sections and of second sections. For example, the hotmelt adhesive body may comprise a first section and a second section or else two first sections and two second sections, and so on.

In general, in accordance with the invention, it may be the case that the hotmelt adhesive body comprises a plurality of, especially two, three, four or more, first sections and a plurality of, especially two, three, four or more, second sections.

In general, in this context, it may be the case that the first section and/or the first sections, on the one hand, and the second section and/or the second sections, on the other hand, are disposed in alternation and/or alternately to one another along the longitudinal axis of the hotmelt adhesive body. Accordingly, in the context of the processing, the hotmelt adhesive or the cleaning agent is discharged in alternating order. For the corresponding selection of the number of respective sections, therefore, it is possible to dictate the number of discharge intervals of the reactive hotmelt adhesive on the one hand and of the cleaning agent on the other.

In accordance with the invention, it may be the case that the first section and the second section comprise lengths different from one another.

In this context, it may in particular be the case that the first section comprises a greater length than the second section.

Equally, the length ratio of the first section to the second section [length ratio first section:second section] may be in the range from 50:1 to 0.5:1, especially in the range from 25:1 to 0.75:1, preferably in the range from 10:1 to 1:1, more preferably in the range from 5:1 to 1.25:1, very preferably in the range from 4:1 to 1.5:1.

In particular, the length ratio of the first section to the second section [length ratio first section:second section] may be at least 0.5:1, especially at least 0.75:1, preferably at least 1:1, more preferably at least 1.25:1, very preferably at least 1.5:1.

Moreover, the length ratio of the first section to the second section [length ratio first section:second section] may be at most 50:1, especially at most 25:1, preferably at most 10:1, more preferably at most 5:1, very preferably at most 4:1.

In particular, in accordance with the invention, it may also be the case that the first section and the second section comprise volumes that are different from one another, especially volumes of reactive hotmelt adhesive on the one hand and cleaning agent volume on the other hand.

Accordingly, in accordance with the invention, it may be the case that the volume of the first section, especially volume of reactive hotmelt adhesive, is greater than the volume, especially cleaning agent volume, of the second section.

In accordance with the invention, it may in particular be the case that the volume ratio of the first section to the second section [volume ratio first section:second section] is in the range from 50:1 to 0.5:1, especially 25:1 to 0.75:1, preferably 10:1 to 1:1, more preferably 5:1 to 1.25:1, very preferably 4:1 to 1.5:1

Correspondingly, it may in accordance with the invention be the case that the volume ratio of the first section to the second section [volume ratio first section:second section] is at least 0.5:1, especially at least 0.75:1, preferably at least 1:1, more preferably at least 1.25:1, very preferably at least 1.5:1.

In particular, the volume ratio of the first section to the second section [volume ratio first section:second section] is at most 50:1, especially at most 25:1, preferably at most 10:1, more preferably at most 5:1, very preferably at most 4:1.

Through the targeted selection of the length ratio of the first and second sections and/or of the volume ratio of the sections in question it is possible for the respective amounts of reactive hotmelt adhesive, on the one hand, and cleaning agent, on the other hand, that are to be discharged or applied, respectively, to be predetermined or adjusted and harmonized with one another. Provision is made in accordance with the invention, in particular, for there to be a correspondingly greater volume of reactive hotmelt adhesive in comparison to the volume of cleaning agent, thereby extending the processing step of adhesive application accordingly. In particular, the length of the second section and/or its volume ought to be selected or adjusted in order to ensure efficient purging or cleaning of the relevant hotmelt adhesive gun correspondingly, for which the skilled person is in a position to achieve at any time.

With regard to the arrangement of the sections, moreover, it is possible in the processing direction of the hotmelt adhesive body, especially in the case of the employment or processing of the hotmelt adhesive body in a hotmelt glue gun, for the first section to be disposed downstream of the second section, adjoining the first section. According to this embodiment, therefore, in the processing direction of the hotmelt adhesive body, the first section is arranged, so to speak, upstream of the adjoining second section, and so on processing it as the adhesive that is first discharged.

In particular it may be the case that in processing direction of the hotmelt adhesive body, especially in the case of the employment and/or processing of the hotmelt adhesive body in a hotmelt glue gun, the section disposed first downstream is formed by the first section. It follows from this that in the processing or employment of the hotmelt adhesive body of the invention in a hotmelt glue gun, it is the reactive hotmelt adhesive that is discharged first, allowing adhesive bonding to be commenced immediately. An arrangement of this kind is especially advantageous when, in operation preceding the standstill of the hotmelt glue gun, rinsing or cleaning has been performed lastly.

Equally, however, it may also be the case in accordance with the invention that in processing direction of the hotmelt adhesive body, especially in the case of the employment and/or processing of the hotmelt adhesive body in a hotmelt glue gun, the section disposed first downstream is formed by the second section. This means that in the processing or employment of the hotmelt adhesive body or in operation of the hotmelt glue gun, the apparatus is first purged or cleaned with the cleaning agent, thereby optimizing the subsequent discharge or subsequent application of the reactive hotmelt adhesive.

In accordance with the invention, therefore, it may be the case that in processing direction of the hotmelt adhesive body, especially in the case of the employment and/or processing of the hotmelt adhesive body in a hotmelt glue gun, the section disposed first downstream is formed by the first section or else that in processing direction of the hotmelt adhesive body, especially in the case of the employment and/or processing of the hotmelt adhesive body in a hotmelt glue gun, the section disposed first downstream is formed by the second section.

According to one embodiment preferred in accordance with the invention, in processing direction of the hotmelt adhesive body, especially in the case of the employment and/or processing of the hotmelt adhesive body in a hotmelt glue gun, the section disposed last downstream is formed by the second section. Accordingly, in the processing or employment of the hotmelt adhesive body according to the invention, within the respective operation of the hotmelt glue gun, the concluding step is a rinsing or cleaning of the hotmelt glue gun, allowing this gun to be shut down, correspondingly, in the cleaned state, so that for this reason as well there is an assurance of immediate resumption of operation for a subsequent processing cycle.

The dimensioning of the first section and, respectively, of the second section, and hence of the hotmelt adhesive body of the invention, may vary within wide ranges:

In particular, the hotmelt adhesive body may have a length in the range from 1 cm to 100 cm, especially in the range from 2 cm to 80 cm, preferably in the range from 3 cm to 60 cm, more preferably in the range from 4 cm to 40 cm, very preferably in the range from 5 cm to 30 cm.

Equally, the hotmelt adhesive body may have a diameter in the range from 0.1 cm to 10 cm, especially in the range from 0.2 cm to 5 cm, preferably in the range from 0.4 cm to 4 cm, more preferably in the range from 0.5 cm to 3 cm, very preferably in the range from 0.6 cm to 1.5 cm.

In particular, the hotmelt adhesive body may have sizes standardized or commercially customary for hotmelt adhesive sticks. In this connection, the hotmelt adhesive body or hotmelt adhesive stick according to the invention may be designed in the manner of an adhesive stick or adhesive cartridge for employment in commercially customary hotmelt glue guns. For this purpose, the hotmelt adhesive body in stick form may have, for example, (commercially) customary diameters of 7 mm, 11 mm, 12 mm or 18 mm, with an adhesive stick length, for example, of 5 cm to 30 cm (e.g., length of 30 cm for a diameter of 19 mm, and length of 20 cm for a diameter of 12 mm).

In accordance with the invention it is preferred, furthermore, if the first section and/or the second section is in each case configured to be homogeneous, this referring in particular to the fact that the respective components are present or distributed uniformly in the respective section. This leads to harmonization and/or to high quality of the respective discharge on processing both of the reactive hotmelt adhesive and of the cleaning agent.

With regard, furthermore, to the reactive hotmelt adhesive used in accordance with the invention, it may be the case that the reactive hotmelt adhesive is a thermoplastic and/or one-component hotmelt adhesive. By configuring the reactive hotmelt adhesive as a thermoplastic hotmelt adhesive, in particular, defined melting characteristics in the context of the processing or employment are ensured or enabled. Moreover, the configuration of the reactive hotmelt adhesive as a one-component hotmelt adhesive leads to advantages specific to application and/or to processing.

Generally speaking, it may be the case in accordance with the invention that the reactive hotmelt adhesive is a moisture-crosslinking, heat-crosslinking and/or radiation-crosslinking hotmelt adhesive, especially a moisture-crosslinking hotmelt adhesive. For the embodiment of the invention whereby the reactive hotmelt adhesive is a moisture-crosslinking hotmelt adhesive, any (post) crosslinking taking place as part of the processing or employment may take place, for example, in the presence of atmospheric moisture.

In general, the reactive hotmelt adhesive comprises chemically reactive groups. In this context, the chemically reactive groups may be selected from isocyanate groups, silane groups, epoxide groups, urethane groups and reactive double or multiple bonds (especially C—C double or multiple bonds) and also combinations thereof, preferably isocyanate groups and silane groups. In particular, the chemically reactive groups are arranged terminally or terminally in the molecular scaffold of the reactive hotmelt adhesive. The chemically reactive groups in question, in the employment or use of the hotmelt adhesive body according to the invention, without wishing to be restricted to this theory, lead to defined postcrosslinking and also to the development of chemical adhesive bonds with an article to be bonded, resulting ultimately in outstanding bonding properties and in high heat stability on the part of the adhesive.

In accordance with the invention, it may in particular be the case that the reactive hotmelt adhesive is selected from the group of (i) reactive, especially moisture-crosslinking polyurethanes (PUR), preferably polyurethanes functionalized with isocyanate groups and/or containing isocyanate groups, more preferably isocyanate-terminated polyurethanes; (ii) reactive, especially moisture-crosslinking polyolefins (POR), preferably polyolefins functionalized with silane groups and/or containing silane groups, more preferably polyolefins grafted with silane groups; (iii) reactive, especially radiation-crosslinking, preferably UV-crosslinking poly(meth)acrylates, preferably poly(meth)acrylates functionalized with urethane groups and/or containing urethane groups; and also combinations thereof, more preferably from the group of (i) reactive, especially moisture-crosslinking polyurethanes (PUR), preferably polyurethanes functionalized with isocyanate groups and/or containing isocyanate groups, more preferably isocyanate-terminated polyurethanes, and also combinations thereof.

In this connection, in particular, the aforesaid reactive PUR hotmelt adhesives have high temperature resistances and a high resistance to a multiplicity of chemicals, whereas one of the features of the polyolefins, especially silane-modified polyolefins in question is that, for example, bonding is possible even of unpretreated polyolefins, especially polypropylene, as the substrate to be bonded.

In general, the reactive hotmelt adhesive ought to be in the solid state at room temperature (20° C.) and ambient pressure (1 013.25 hPa). Moreover, the reactive hotmelt adhesive ought to have a softening point and/or range, especially determined by ring and ball, preferably determined according to DIN EN 1238:2011-07, of between 40° C. and 100° C., especially between 50° C. and 90° C., preferably between 55° C. and 80° C.

In this context, the reactive hotmelt adhesive ought to have a softening point and/or range, especially determined by ring and ball, preferably determined according to DIN EN 1238:2011-07, of at least 40° C., especially at least 50° C., preferably at least 55° C., preferably at least 60° C.

In the context of the present invention it is of advantage, moreover, if the reactive hotmelt adhesive has a melting point, especially determined by means of Dynamic Scanning calorimetry (DSC), preferably determined according to DIN 53765:1994-03, in the range from 55° C. to 275° C., especially in the range from 65° C. to 225° C., preferably in the range from 70° C. to 175° C.

In this context, it may also be the case that the reactive hotmelt adhesive has a processing temperature, especially determined by means of Dynamic Scanning Calorimetry (DSC), preferably determined according to DIN 53765: 1994-03, in the range from 80° C. to 300° C., especially in the range from 90° C. to 250° C., preferably in the range from 95° C. to 200° C.

It is also of advantage if the reactive hotmelt adhesive has a viscosity, especially dynamic viscosity and/or especially determined according to DIN EN ISO 3219:1994-10 and/or especially in the temperature range from 95° C. to 200° C., in the range from 5 000 mPas to 150 000 mPas, especially in the range from 7 500 mPas to 125 000 mPas, preferably in the range from 10 000 mPas to 100 000 mPas.

Moreover, the reactive hotmelt adhesive ought to have a density ρ, especially determined at a temperature of 20° C. and/or especially determined according to DIN 51757:2011-01, in the range from 0.5 $g/cm^3$ to 2.5 $g/cm^3$, especially in the range from 0.6 $g/cm^3$ to 2.3 $g/cm^3$, preferably in the range from 0.7 $g/cm^3$ to 2.1 $g/cm^3$, more preferably in the range from 0.8 $g/cm^3$ to 2 $g/cm^3$.

The aforesaid properties and/or parameters of the reactive hotmelt adhesive lead in particular to application-specific and/or processing-specific properties and advantages, particularly with regard to the melting characteristics, the flowability and the discharge behavior in particular from a hotmelt glue gun.

As a reactive hotmelt adhesive it is possible, for example, to use the commercially available product Jowatherm Reaktant 601.60, sold by Jowat S E.

With regard, moreover, to cleaning or purging agent used in accordance with the invention, it is the case in particular in accordance with the invention that the cleaning agent is a thermoplastic, especially a nonreactive thermoplastic, and/or a nonreactive hotmelt adhesive, especially a thermoplastic nonreactive hotmelt adhesive. It follows from this that after renewed operation, the cleaning agent can be removed from the hotmelt glue gun by exposure to heat, by melting.

In particular, the cleaning agent is a cleaning agent compatible with the hotmelt adhesive. The term "compatible" as used in the context of the present invention is understood in particular to mean that with regard to the reactive hotmelt adhesive, the cleaning agent is designed and/or selected in such a way as to ensure extremely efficient purging or cleaning of the associated hotmelt glue gun as part of the employment of the hotmelt adhesive body, and therefore efficient removal of the reactive hotmelt adhesive. Here, the term "compatible" also refers in particular to corresponding physicochemical properties of the cleaning agent, of the kind defined in particular below:

In this context, it is of advantage in accordance with the invention if the cleaning agent is selected from the group of (i) ethylene-vinyl acetates (EVA polymers); (ii) (meth)acrylates; (iii) polyolefins (PO), especially polyethylenes (PE), polypropylenes (PP), and atactic polyolefins (APAO); (iv) polyurethanes (PU); (v) polyamides (PA); (vi) polyesters (PES); and combinations thereof, more preferably from the group of (i) ethylene-vinyl acetates (EVA polymers); (ii) (meth)acrylates; (iii) polyolefins (PO); and combinations thereof.

According to one embodiment of the invention, moreover, it may be the case that the cleaning agent and/or the second section comprises at least one additive which reacts with the reactive hotmelt adhesive, especially with the chemically reactive groups of the reactive hotmelt adhesive, and/or which deactivates the chemically reactive groups of the reactive hotmelt adhesive. With an additive of this kind present, it is possible when cleaning and/or purging to realize a corresponding deactivation of the chemically reactive groups of the reactive hotmelt adhesive, thereby preventing its (post)crosslinking and/or the formation of chemical adhesive connections (e.g., to the inner surfaces of the constituents of the hotmelt glue guns that carry the melt of the reactive hotmelt adhesive). With an additive present, as defined above, therefore, the reactive groups of the reactive adhesive can be blocked and therefore, so to speak, the reactive hotmelt adhesive as such can be deactivated and converted into a nonreactive hotmelt adhesive. As a result, the purging or cleaning can be subsequently improved or facilitated. Moreover, any contamination of (previously) reactive hotmelt adhesive is less critical, since in the inactive state it can again be melted and applied, by subsequent heating.

In this context, the additive ought to comprise a functional group, especially hydroxyl group, which reacts with the reactive hotmelt adhesive, especially with the chemically reactive groups of the reactive hotmelt adhesive. In this context, moreover, the additive ought to have single functionality or be monofunctional. The furnishing of the additive with a hydroxyl group is contemplated, for example, when using reactive PUR hotmelt adhesives, since the relevant hydroxyl group is capable of reacting with the free isocyanate groups of the PUR hotmelt adhesive. Accordingly, in principle, the use of amine groups or amide groups is also contemplated, depending on the particular reactive hotmelt adhesive used. The skilled person is able at any time to select the corresponding reactive groups of the additive and to tailor them to the reactive hotmelt adhesive employed.

With regard, moreover, to the additive, it has proven advantageous if the additive at a temperature of 20° C. has a vapor pressure of at most 50 Pa, especially at most 40 Pa, preferably at most 30 Pa, more preferably at most 20 Pa. By this means, in particular, premature evaporation of the additive is prevented, especially in the case of processing at high temperatures. In this context as well, the additive ought to comprise a functional group, especially hydroxyl group, which reacts with the reactive hotmelt adhesive, especially with the chemically reactive groups of the reactive hotmelt adhesive. In this connection as well, moreover, the additive ought to have single functionality or be monofunctional.

Furthermore, the additive ought to be an organic compound, especially a monoalcohol, preferably a $C_3$-$C_{30}$ monoalcohol, especially a $C_6$-$C_{30}$ fatty alcohol, and/or benzyl alcohol.

In particular, the cleaning agent and/or the second section may contain the additive in amounts of at most 20 wt. %, especially at most 15 wt. %, preferably at most 10 wt. %, more preferably at most 5 wt. %, very preferably at most 2 wt. %, based on the cleaning agent and/or the second section. In particular, the cleaning agent and/or the second section may contain the additive in amounts in the range from 0.1 wt. % to 20 wt. %, especially in the range from 0.5 wt. % to 15 wt. %, preferably in the range from 0.75 wt. % to 10 wt. %, more preferably in the range from 1 wt. % to 5 wt. %, very preferably in the range from 1.25 wt. % to 2 wt. %, based on the cleaning agent and/or the second section.

Furthermore, the cleaning agent and/or the second section may include at least one wax, especially a natural, synthetic or chemically modified (semisynthetic) wax. In this connection, the cleaning agent and/or the second section may contain the wax in amounts of at most 15 wt. %, especially at most 10 wt. %, preferably at most 5 wt. %, based on the cleaning agent and/or the second section. In particular the cleaning agent and/or the second section may contain the wax in amounts in the range from 0.5 wt. % to 15 wt. %, especially in the range from 1 wt. % to 10 wt. %, preferably in the range from 1.5 wt. % to 5 wt. %, based on the cleaning agent and/or the second section. By this means it is also possible in particular to subsequently set the flowability of the cleaning agent.

As a cleaning agent it is possible, for example, to use the commercially available product 930.34 sold by Jowat S E. This product is a formulation based on EVA and wax, where the formulation may optionally be admixed with a monoalcohol as additive, particularly for neutralizing isocyanate groups of a PUR hotmelt adhesive which is used as the reactive hotmelt adhesive. This cleaning agent may in particular be combined with the aforesaid reactive hotmelt adhesive Jowatherm Reaktant 601.60 from Jowat S E in the hotmelt adhesive body of the invention, in the form in each case of separate sections.

It is an advantage in accordance with the invention, moreover, if the cleaning agent and the reactive hotmelt adhesive have (i) at least substantially identical softening points and/or ranges and/or (ii) at least substantially identical melting points and/or processing temperatures and/or (iii) at least substantially identical viscosities and/or (iv) at least substantially identical densities.

In this connection, the cleaning agent may have a softening point and/or range which deviates by at most 20%, especially at most 10%, preferably at most 5% from that of the reactive hotmelt adhesive, based on the softening point and/or range of the reactive hotmelt adhesive, and/or a melting point or processing temperature which deviates by at most 20%, especially at most 10%, preferably at most 5% from that of the reactive hotmelt adhesive, based on the melting point or processing temperature of the reactive hotmelt adhesive. Moreover, the cleaning agent may have a viscosity which deviates by at most 20%, especially at most 10%, preferably at most 5% from that of the reactive hotmelt adhesive, based on the viscosity of the reactive hotmelt adhesive. Moreover, the cleaning agent may have a density which deviates by at most 50%, especially at most 40%, preferably at most 30% from that of the reactive hotmelt adhesive, based on the density of the reactive hotmelt adhesive.

Furthermore, the cleaning agent ought to be in the solid state at room temperature (20° C.) under ambient pressure (1 013.25 hPa).

Moreover, the cleaning agent ought to have a softening point and/or range, especially determined by ring and ball, preferably determined according to DIN EN 1238:2011-07, of between 40° C. and 100° C., especially of between 50° C. and 90° C., preferably of between 55° C. and 80° C.

Equally, the cleaning agent ought to have a softening point and/or range, especially determined by ring and ball, preferably determined according to DIN EN 1238:2011-07, of at least 40° C., especially at least 50° C., preferably at least 55° C., preferably at least 60° C.

Moreover, the cleaning agent ought to have a melting point, especially determined by means of Dynamic Scanning calorimetry (DSC), preferably determined according to DIN 53765:1994-03, in the range from 55° C. to 275° C., especially in the range from 65° C. to 225° C., preferably in the range from 70° C. to 175° C.

Furthermore, the cleaning agent ought to have a processing temperature, especially determined by means of Dynamic Scanning calorimetry (DSC), preferably determined according to DIN 53765:1994-03, in the range from 80° C. to 300° C., especially in the range from 90° C. to 250° C., preferably in the range from 95° C. to 200° C.

Moreover, the cleaning agent ought to have a viscosity, especially dynamic viscosity and/or especially determined according to DIN EN ISO 3219:1994-10 and/or in the temperature range from 95° C. to 200° C., in the range from 5 000 mPas to 150 000 mPas, especially in the range from 7 500 mPas to 125 000 mPas, preferably in the range from 10 000 mPas to 100 000 mPas.

Furthermore, the cleaning agent ought to have a density $\rho$, especially determined at a temperature of 20° C. and/or especially determined according to DIN 51757:2011-01, in the range from 0.5 $g/cm^3$ to 2.5 $g/cm^3$, especially in the range from 0.6 $g/cm^3$ to 2.3 $g/cm^3$, preferably in the range from 0.7 $g/cm^3$ to 2.1 $g/cm^3$, more preferably in the range from 0.8 $g/cm^3$ to 2 $g/cm^3$.

In accordance with the invention, moreover, it may be the case that the second section and/or the cleaning agent or the first section and/or the reactive hotmelt adhesive, especially the second section and/or the cleaning agent, comprise at least one coloring component and/or at least one colorant. In this connection, it may be the case in accordance with the invention that the coloring component and/or the colorant is a pigmentary colorant, especially an organic or inorganic pigmentary colorant.

In accordance with the invention, however, it may also be the case that the second section and/or the cleaning agent and the first section and/or the reactive hotmelt adhesive each comprise at least one coloring component and/or at least one colorant, wherein the coloring component and/or the colorant of the second section and/or of the cleaning agent on the one hand and the coloring component and/or the colorant of the first section and/or of the reactive hotmelt adhesive on the other hand are visually and/or optically distinguishable, especially wherein the coloring components and/or the colorants are pigmentary colorants, especially organic or inorganic pigmentary colorants.

In accordance with the invention, however, it may also be the case that only the second section and/or only the cleaning agent comprises at least one coloring component and/or at least one colorant. In this connection as well, the coloring component and/or the colorant ought to be a pigmentary colorant, especially an organic or inorganic pigmentary colorant.

In accordance with the invention, furthermore, it may also be the case that only the first section and/or only the reactive hotmelt adhesive comprises at least one coloring component and/or at least one colorant. For this case as well, the coloring component and/or the colorant ought to be a pigmentary colorant, especially an organic or inorganic pigmentary colorant.

In accordance with the invention, the relevant colorant or coloring component should be selected in particular such that within the employment or processing of the hotmelt adhesive body as well it is chemically stable, especially thermally stable, and does not disintegrate in use, so that the relevant optical or visual difference remains perceptible and/or optically and/or visually capturable even in the case of corresponding employment or processing and/or the presence of the components in the form of a melt.

In this context, it may be the case in accordance with the invention, by way of example and in a nonlimiting way, that the coloring component and/or the colorant is an inorganic pigmentary colorant, especially selected from the group of iron oxide, titanium dioxide, chromium oxide and mixtures thereof, especially iron oxide and titanium dioxide.

Moreover, the coloring component and/or the colorant may be an organic pigmentary colorant, especially selected from the group of azo pigments, especially monoazo, diazo, naphthol, benzimidazolone, and metal complex pigments; polycyclic pigments, especially phthalocyanine pigments; benzimidazolones and mixtures thereof.

The amount and/or concentration of coloring component or colorant may vary here within wide ranges in relation to the respective sections:

In accordance with the invention, however, particularly good results are obtained if the first section and/or the reactive hotmelt adhesive on the one hand or the second section and/or the cleaning agent on the other hand contains the coloring component and/or the colorant, independently of one another, in amounts in the range from 0.01 wt. % to 10 wt. %, especially in the range from 0.05 wt. % to 5 wt. %, preferably in the range from 0.1 wt. % to 4 wt. %, more preferably in the range from 0.5 wt. % to 3 wt. %, based on the respective section and/or on the reactive hotmelt adhesive or the cleaning agent.

In particular, the second section and/or the cleaning agent may contain the coloring component and/or the colorant in amounts in the range from 0.01 wt. % to 10 wt. %, especially in the range from 0.05 wt. % to 5 wt. %, preferably in the range from 0.1 wt. % to 4 wt. %, more preferably in the range from 0.5 wt. % to 3 wt. %, based on the second section and/or the cleaning agent.

In the context of the present invention, the following combinations of reactive hotmelt adhesive on the one hand and cleaning agent on the other have proved themselves in particular:

Hence in accordance with the invention it may be the case that the reactive hotmelt adhesive comprises or consists of a reactive, especially moisture-crosslinking polyurethane (PUR), preferably polyurethane functionalized with isocyanate groups and/or containing isocyanate groups, more preferably isocyanate-terminated polyurethane, and the cleaning agent comprises or consists of a nonreactive ethylene-vinyl acetate (EVA polymer). In this connection, the cleaning agent may contain at least one additive comprising a hydroxyl group, especially as defined above.

Moreover, the reactive hotmelt adhesive may comprise or consist of a reactive, especially moisture-crosslinking polyolefin (POR), preferably polyolefin functionalized with silane groups and/or containing silane groups, more preferably polyolefin grafted with silane groups, and the cleaning agent comprises or consists of a nonreactive polyolefin (PO). In this context, the cleaning agent may optionally comprise at least one additive which reacts with the reactive hotmelt adhesive, especially with the chemically reactive groups of the reactive hotmelt adhesive, and/or which deactivates the chemically reactive groups of the reactive hotmelt adhesive.

Moreover, the reactive hotmelt adhesive may comprise or consist of a reactive, especially radiation-crosslinking, preferably UV-crosslinking poly(meth)acrylate, preferably poly(meth)acrylate functionalized with urethane groups and/or containing urethane groups, and the cleaning agent comprises or consists of a nonreactive (meth)acrylate. In this context, the cleaning agent may optionally comprise at least one additive which reacts with the reactive hotmelt adhesive, especially with the chemically reactive groups of the reactive hotmelt adhesive, and/or which deactivates the chemically reactive groups of the reactive hotmelt adhesive.

With further regard to the hotmelt adhesive body of the invention, it may be obtainable by assembling, especially permanently joining, at least one first section and at least one second section, wherein the respective sections after their production are joined, especially adhesively bonded, permanently to one another at their opposite faces, especially base faces, preferably by partial melting of at least one of the opposite faces, especially base faces.

In the context of the present invention, moreover, it may the case that the hotmelt adhesive body is present and/or inserted in an envelope and/or surround packaging which especially is at least substantially impervious to air and/or moisture. Equally, the hotmelt adhesive body may comprise at least one coating, especially based on wax, which especially is at least substantially impervious to air and/or moisture. By this means, the storage properties and/or storage times of the hotmelt adhesive body according to the invention are increased, since in particular any premature reaction of the chemically reactive groups especially of the reactive hotmelt adhesive is prevented.

As indicated above, the present invention overall provides a high-performance hotmelt adhesive body having outstanding service and/or processing properties in respect both of the underlying bonding performance and of the handling in the context of use in a hotmelt glue gun.

A further subject of the present invention—according to a second aspect of the invention—is the method for producing the hotmelt adhesive body according to the invention, especially hotmelt adhesive stick, as defined above, wherein at least one first section, comprising or consisting of at least one reactive hotmelt adhesive and at least one second section, comprising or consisting of at least one cleaning agent, are first produced in isolation and/or independently of one another and/or separately from one another and after their production are assembled, especially joined, preferably adhesively bonded, permanently to one another at their opposite faces, especially base faces.

The relevant sections of the hotmelt adhesive body of the invention may be produced in a manner known per se to the skilled person, as for example using an extruder or a gear pump. For example, the sections in question may first be produced as continuous strands or continuous sticks, which are then cut, especially automatedly, into the corresponding lengths of the relevant sections.

In accordance with the invention, the assembling of the relevant sections for the purpose of obtaining the hotmelt adhesive body of the invention may be accomplished, for example, by partial melting and/or melting of at least one of the opposite faces, especially base faces, of the first section and/or of the second section.

By virtue of the procedure of the invention, the overall effect is to ensure a stable assembly of the sections for forming the hotmelt adhesive body of the invention, with the presence, moreover, of a discrete and/or (selectively) sharp transition and/or a (selectively) sharp connection of the respective sections, which is associated with correspondingly practical advantages and also with improved storage properties on the part of the hotmelt adhesive body of the invention.

A further subject of the present invention in this context—according to a third aspect of the invention—is also the hotmelt adhesive body, especially hotmelt adhesive stick, of the invention, which is obtainable by the above-described method in accordance with the present invention.

Yet a further subject of the present invention—according to a fourth aspect of the invention—is, moreover, a hotmelt adhesive discharge apparatus, especially hotmelt and/or hot glue gun, preferably for melting and/or discharging and/or applying reactive hotmelt adhesive, preferably for the processing and/or employment of hotmelt adhesive bodies, especially hotmelt adhesive sticks, wherein the hotmelt adhesive discharge apparatus comprises at least one hotmelt adhesive body as defined above.

In this connection, the hotmelt adhesive discharge apparatus may comprise at least one accommodating facility for the hotmelt adhesive body and/or at least one transport facility for the hotmelt adhesive body and/or at least one melting facility for the hotmelt adhesive body and/or at least one discharge and/or application facility, preferably an adhesive nozzle, especially for the melted hotmelt adhesive and/or for the melted cleaning agent of the hotmelt adhesive body. In this case it is possible in particular for the melting facility on the one hand and the discharge and/or application facility on the other to form a structural unit or to be present as a common component.

Yet a further subject of the present invention—according to a fifth aspect of the present invention—is, moreover, the kit of the invention, especially kit for melting and/or discharging and/or applying reactive hotmelt adhesive, preferably for the processing and/or employment of hotmelt adhesive bodies, especially hotmelt adhesive sticks, wherein the kit comprises at least one hotmelt adhesive discharge apparatus, especially hotmelt and/or hot glue gun, preferably as defined above, and at least one hotmelt adhesive body, especially hotmelt adhesive stick, as defined above, preferably a plurality of hotmelt adhesive bodies.

Moreover, a further subject of the present invention—according to a sixth aspect of the invention—is the pack unit of the invention and/or the container according to the invention, comprising at least one hotmelt adhesive body, especially hotmelt adhesive stick, as defined above, especially wherein the hotmelt adhesive body is present and/or inserted in surround packaging that especially is at least substantially impermeable to air and/or moisture.

Furthermore, a further subject of the present invention—according to a seventh aspect of the invention—is the use of at least one hotmelt adhesive body, preferably hotmelt adhesive stick, as defined above for joining and/or bonding processes and/or for the joining and/or bonding of articles and/or components and/or substrates.

Moreover, a subject of the present invention—according to an eighth aspect of the invention—is the use of at least one coloring component and/or colorant, especially as defined above, for identifying and/or providing a visual and/or optical difference, especially color difference, of at least one first section, on the one hand, and at least one second section, on the other hand, of a hotmelt adhesive body, especially hotmelt adhesive stick, especially as defined above, wherein the first section comprises a reactive hotmelt adhesive and the second section comprises at least one cleaning agent, especially in the employment and/or processing of the hotmelt adhesive body preferably by means of a hotmelt glue gun, especially in the discharge and/or the application of the reactive hotmelt adhesive on the one hand and of the cleaning agent on the other hand, especially in the form of the respective melt, especially wherein the first section and/or the reactive hotmelt adhesive, on the one hand, and the second section and/or the cleaning agent, on the other hand, are configured to be optically different from one another, especially different in color from one another, especially wherein the coloring component and/or colorant is incorporated into the first section and/or into the reactive hotmelt adhesive, on the one hand, and/or into the second section and/or into the cleaning agent, on the other hand.

Lastly, the present invention—according to a ninth aspect of the invention—relates to the method of the invention for identifying and/or providing a visual and/or optical difference, especially color difference, of at least one first section, on the one hand, and at least one second section, on the other hand, of a hotmelt adhesive body, especially hotmelt adhesive stick, especially as defined above, wherein the first section comprises a reactive hotmelt adhesive and the second section comprises at least one cleaning agent, especially in the employment and/or processing of the hotmelt adhesive body preferably by means of a hotmelt glue gun, especially in the discharge and/or the application of the reactive hotmelt adhesive on the one hand and of the cleaning agent on the other hand, especially in the form of the respective melt, wherein the first section and/or the reactive hotmelt adhesive, on the one hand, and the second section and/or the cleaning agent, on the other hand, are configured to be optically different from one another, especially different in color from one another, especially wherein at least one coloring component and/or colorant, especially as defined above, is incorporated into the first section and/or into the reactive hotmelt adhesive, on the one hand, or into the second section and/or into the cleaning agent, on the other hand.

In the text below, the present invention is elucidated in more detail with reference to figures or drawings which represent preferred exemplary embodiments. In connection with the elucidation of these preferred exemplary embodiments of the present invention, which, however, are in no way limiting on the present invention, there is also description of further advantages, properties and aspects and features of the present invention.

Figure 1B:
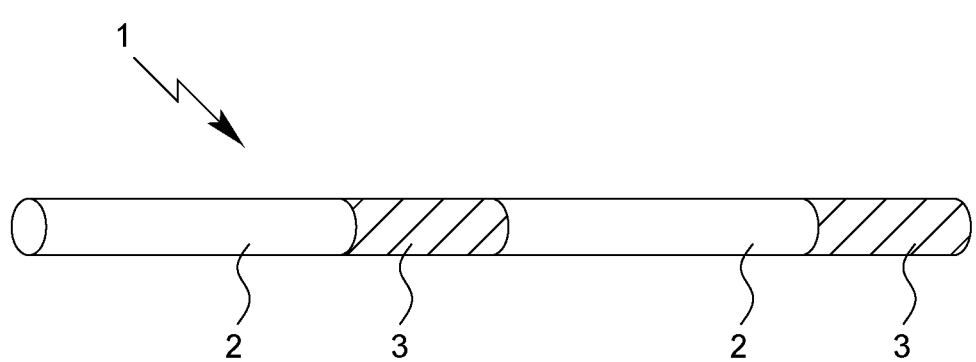
FIG. 1B shows a schematic plan view of a hotmelt adhesive body of the invention according to another embodiment of the present invention.
Figure 1C:
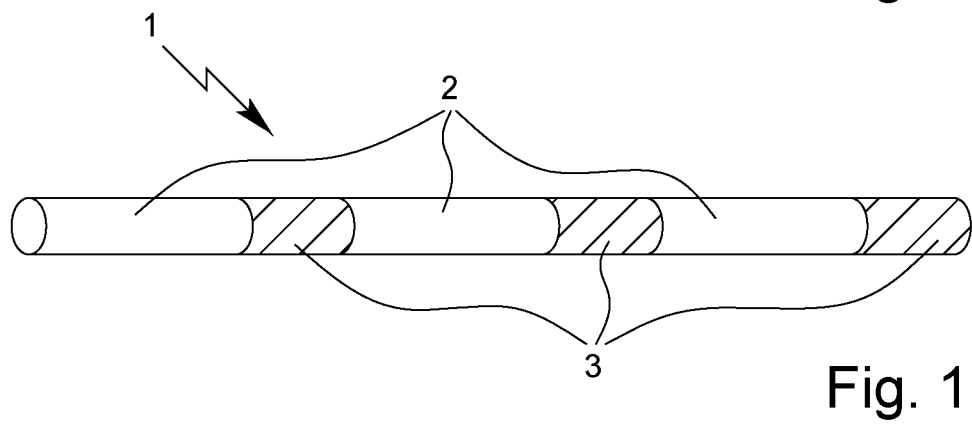
FIG. 1C shows a schematic plan view of a hotmelt adhesive body according to the invention, in accordance with yet another embodiment of the present invention.
Figure 1D:
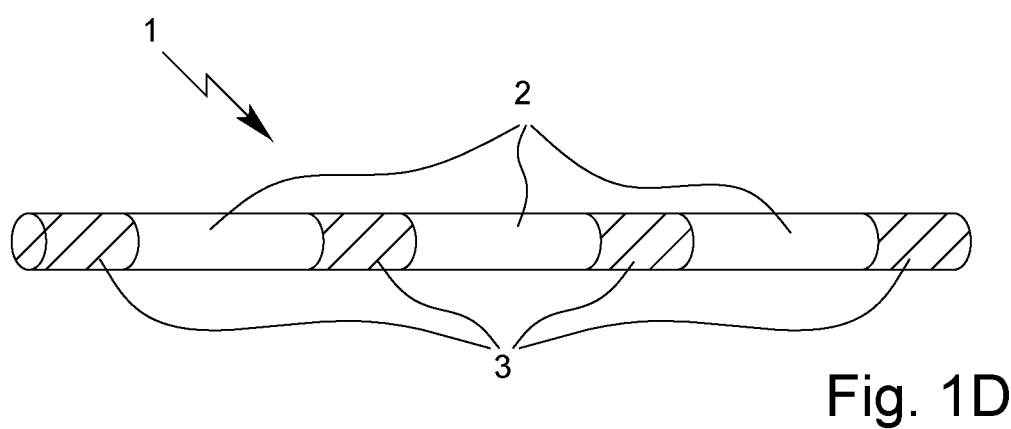
FIG. 1D shows a schematic plan view of a hotmelt adhesive body of the invention, in accordance with again another embodiment of the present invention.
Figure 2A:
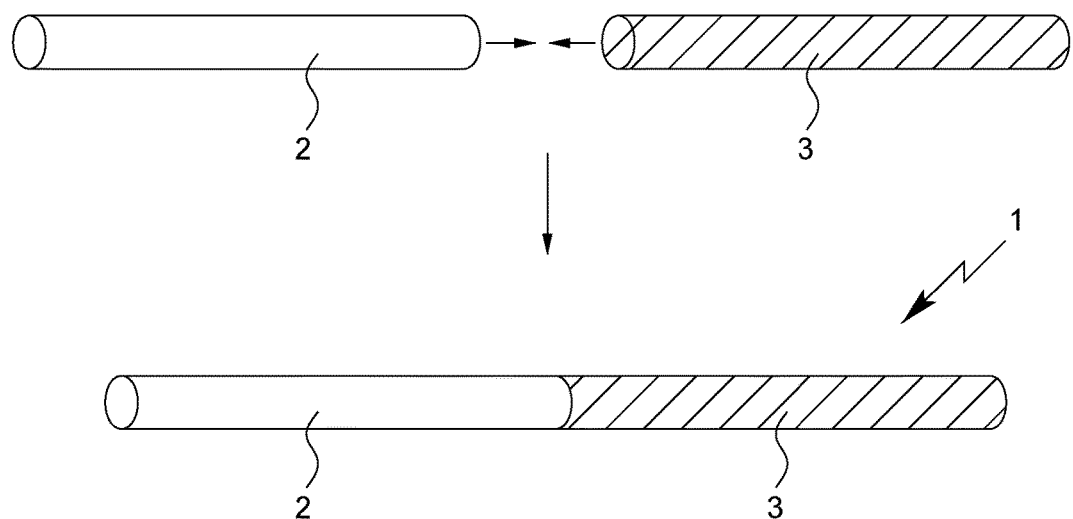
FIG. 2A shows a schematic representation of the procedure of the invention for providing a hotmelt adhesive body according to the invention.
Figure 2B:
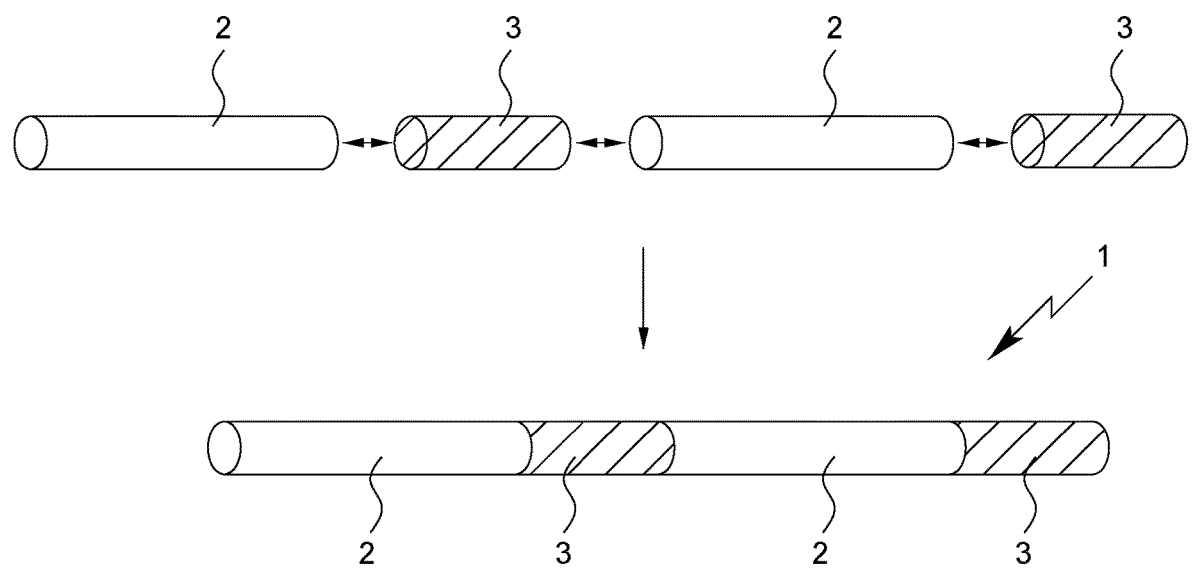
FIG. 2B shows a schematic representation of the procedure of the invention for providing a hotmelt adhesive body of the invention, in accordance with a further embodiment of the present invention.

In the figures,

FIG. 1A shows a schematic plan view of a cylindrically shaped hotmelt adhesive body of the invention, present in the form of a hotmelt adhesive stick;

FIG. 1B shows a schematic plan view of a hotmelt adhesive body of the invention according to another embodiment of the present invention;

FIG. 1C shows a schematic plan view of a hotmelt adhesive body according to the invention, in accordance with yet another embodiment of the present invention;

FIG. 1D shows a schematic plan view of a hotmelt adhesive body of the invention, in accordance with again another embodiment of the present invention;

FIG. 2A shows a schematic representation of the procedure of the invention for providing a hotmelt adhesive body according to the invention;

FIG. 2B shows a schematic representation of the procedure of the invention for providing a hotmelt adhesive body of the invention, in accordance with a further embodiment of the present invention;

FIG. 3 shows a schematic representation of a hotmelt adhesive discharge apparatus of the invention, present in particular in the form of a hotmelt glue gun with inserted hotmelt adhesive body according to the invention;

FIG. 3A shows a first operating or employment state of the hotmelt adhesive discharge apparatus with the discharge of the hotmelt adhesive, and FIG. 3B shows a further operating or employment state of the hotmelt adhesive discharge apparatus of the invention with the discharge of the cleaning agent.

FIGS. 1A, 1B, 1C and 1D therefore show the stick-type hotmelt adhesive body 1 of the invention, which more particularly is in the form of a hotmelt adhesive stick and in particular has a cylindrical shape, and so in this respect is suitable accordingly for use in hotmelt glue guns. The figures in question further show that the stick-type hotmelt adhesive body 1 according to the invention comprises at least one first section 2, comprising at least one reactive hotmelt adhesive, and at least one second section 3, comprising at least one cleaning agent (purging agent). The figures in question further illustrate that the first section 2 or the reactive hotmelt adhesive, on the one hand, and the second section 3 or the cleaning agent, on the other hand, are optically different from one another, more particularly being different in color from one another in their design.

In this connection, FIG. 1A shows an inventive hotmelt adhesive body 1 having in each case a first section 2 and a second section 3 which is designed differently from the first section 2 in visual and/or optical terms, more particularly in color. According to FIG. 1B, in turn, an inventive hotmelt adhesive body 1 is shown which in total possesses two first sections 2 and two second sections 3, with the sections 2 and 3 in question being arranged in alternation with one another in the hotmelt adhesive body 1 according to the invention. In this connection, FIG. 1C illustrates a further embodiment of the present invention, having in each case three first sections 2 and three second sections 3, which are also arranged in alternation in the hotmelt adhesive body 1 according to the invention.

In this regard, the hotmelt adhesive bodies 1 according to the invention that are in question, as depicted in FIGS. 1A to 1C, are used in particular in the context of their use or employment particularly in a hotmelt glue gun in such a way that first of all a first section 2 with the reactive hotmelt adhesive is melted and processed, followed by the processing or by purging and/or cleaning on the basis of the second section 3 with the cleaning or purging agent, where finally a second section 3 based on the cleaning agent in each case, for cleaning and/or purging the hotmelt glue gun in question, is processed.

FIG. 1D shows a further inventive embodiment of the inventive hotmelt adhesive body 1, wherein both ends of the hotmelt adhesive body 1 are formed by a second section 3. Accordingly, in the processing or employment of the inventive hotmelt adhesive body 1, there is first processing of a first second section 3 and hence of the cleaning agent, and lastly there is processing of a further second section 3, so that the hotmelt glue gun in question is purged or cleaned with the cleaning agent both at the start of operation and at the end of operation.

With regard to the method of the invention, FIG. 2A and FIG. 2B show the procedure of the invention whereby first of all the respective first sections 2 and the second sections 3 are produced or are present in isolation, and the relevant sections 2 and 3, after having been produced, are joined to one another or connected to one another in the desired sequence on the respective base surfaces of the relevant cylindrical shape or body of the respective sections 2, 3. As a result, it is possible to provide high variability in respect of the specific design of the hotmelt adhesive body 1 according to the invention with a specific purpose against the background of size and order of the sections in question, this size and order being adapted to the particular application.

Lastly, FIG. 3 shows an inventive hotmelt adhesive discharge apparatus 4 with inserted hotmelt adhesive body 1 according to the invention, the hotmelt adhesive discharge apparatus 4 taking the form of a hotmelt glue gun. The hotmelt adhesive discharge apparatus 4 or hotmelt glue gun according to the invention here has a receiving apparatus 5 for the hotmelt adhesive body 1 and also a transport facility 6 for the hotmelt adhesive body 1 and a melting facility 7 for the hotmelt adhesive body. Moreover, the hotmelt adhesive discharge apparatus comprises a discharge or application facility 8 particularly for the melted hotmelt adhesive and/or for the melted cleaning agent of the hotmelt adhesive body. In this connection, FIG. 3A shows the operating state or state of employment whereby melted reactive hotmelt adhesive 2', or reactive hotmelt adhesive 2' that has been converted into the fluid state (starting from the first section 2), is discharged from the discharge and/or application facility 8, more particularly discharge nozzle, or applied. FIG. 3B shows in turn the operating and/or employment state of the cleaning and/or purging of the hotmelt adhesive discharge apparatus 4 with the cleaning agent 3', which is optically and/or visually distinguishable from the reactive hotmelt adhesive 2' and which is also discharged in the melted state or fluid state via the discharge and/or application facility 8.

Further configurations, modifications, variations, adaptations, peculiarities, and advantages of the present invention are readily recognizable and realizable for the skilled person when reading the description, without departing from the scope of the present invention.

LIST OF REFERENCE NUMERALS 1 stick-type hotmelt adhesive body, especially hotmelt adhesive stick, preferably in cylindrical form
2 first section or reactive hotmelt adhesive
2' reactive hotmelt adhesive in melted or fluid state, and/or reactive hotmelt adhesive discharged
3 second section or cleaning agent (purging agent)
3' melted or fluid cleaning agent or discharged cleaning agent
4 hotmelt adhesive discharge apparatus, especially hotmelt glue gun
5 accommodating facility for hotmelt adhesive bodies
6 transport facility for hotmelt adhesive bodies
7 melting facility for hotmelt adhesive bodies
8 discharge and/or application facility

The invention claimed is:
1. A stick-shaped hotmelt adhesive body,
wherein the hotmelt adhesive body comprises:
at least one first section comprising at least one reactive hotmelt adhesive, wherein the reactive hotmelt adhesive is selected from the group consisting of (i) reactive moisture-crosslinking polyurethanes comprising isocyanate groups, (ii) reactive moisture-crosslinking polyolefins comprising silane groups, (iii) reactive radiation-crosslinking poly(meth)acrylates comprising urethane groups as well as combinations thereof, and
at least one second section comprising at least one cleaning or purging agent, wherein the second section further comprises at least one additive which deactivates the chemically reactive groups of the reactive hotmelt adhesive, wherein the additive comprises a functional group which reacts with the chemically reactive groups of the reactive hotmelt adhesive and wherein the additive is monofunctional;
wherein the first section and the second section are configured such to be optically or visually different from one another via difference in color from one another, wherein the second section is of colored configuration and wherein the second section comprises at least one coloring ingredient.

2. The hotmelt adhesive body as claimed in claim 1, wherein the first section is configured such to be at least substantially colorless.

3. The hotmelt adhesive body as claimed in claim 1, wherein the first section comprises no additional coloring ingredient.

4. The hotmelt adhesive body as claimed in claim 1, wherein the first section and the second section are each disposed along the longitudinal axis of the hotmelt adhesive body, such that the longitudinal axis of the first section and the longitudinal axis of the second section lie on the longitudinal axis of the hotmelt adhesive body.

5. The hotmelt adhesive body as claimed in claim 1, wherein the reactive hotmelt adhesive of the first section is a thermoplastic one-component hotmelt adhesive.

6. The hotmelt adhesive body as claimed in claim 1, wherein the reactive hotmelt adhesive of the first section is selected from the group consisting of moisture-crosslinking, heat-crosslinking and radiation-crosslinking hotmelt adhesives as well as mixtures thereof.

7. The hotmelt adhesive body as claimed in claim 1, wherein the cleaning or purging agent of the second section is a thermoplastic.

8. The hotmelt adhesive body as claimed in claim 1, wherein the cleaning or purging agent of the second section is a thermoplastic nonreactive thermoplastic which is compatible with the hotmelt adhesive of the first section.

9. The hotmelt adhesive body as claimed in claim 1, wherein the additive of the second section is a monoalcohol.

10. The hotmelt adhesive body as claimed in claim 1, wherein the additive of the second section is selected from the group consisting of $C_3$-$C_{30}$-monoalcohols and benzyl alcohol as well as mixtures thereof.

11. The hotmelt adhesive body as claimed in claim 1, wherein the coloring ingredient is an inorganic pigmentary colorant selected from the group consisting of iron oxide, titanium dioxide, chromium oxide and mixtures thereof.

12. The hotmelt adhesive body as claimed in claim 1, wherein the coloring ingredient is an organic pigmentary colorant selected from the group consisting of azo pigments, organometal complex pigments, polycyclic pigments, benzimidazolones and mixtures thereof.

13. A method for producing a hotmelt adhesive body as defined in claim 1,
wherein at least one first section comprising at least one reactive hotmelt adhesive and at least one second section comprising at least one cleaning or purging agent are first produced independently and separately from one another and are then, after their respective independent and separate production, assembled and joined to one another at their opposite base faces to result in a hotmelt adhesive body of claim 1.

14. A kit for processing and applying hotmelt adhesive bodies, wherein the kit comprises at least one hotmelt adhesive discharge apparatus and a plurality of hotmelt adhesive bodies each as defined in claim 1.

15. A pack unit comprising a plurality of hotmelt adhesive bodies each as defined in claim 1,
wherein the hotmelt adhesive bodies are packaged surroundedly in a common packaging which is at least substantially impermeable to air and moisture.

16. The pack unit as claimed in claim 15,
wherein the packaging comprises a container.

17. A method for providing a visual or optical difference, via color difference, of at least one first section and at least one second section of a hotmelt adhesive body upon processing and applying the hotmelt adhesive body by means of a hotmelt adhesive discharge apparatus,
wherein the first section comprises at least one reactive hotmelt adhesive selected from the group consisting of (i) reactive moisture-crosslinking polyurethanes comprising isocyanate groups, (ii) reactive moisture-crosslinking polyolefins comprising silane groups, (iii) reactive radiation-crosslinking poly(meth)acrylates comprising urethane groups as well as combinations thereof, and
wherein the second section comprises at least one cleaning or purging agent, wherein the second section further comprises at least one additive which deactivates the chemically reactive groups of the reactive hotmelt adhesive, wherein the additive comprises a functional group which reacts with the chemically reactive groups of the reactive hotmelt adhesive and wherein the additive is monofunctional;
wherein the first section and the second section are configured such to be optically different from one another via difference in color from one another, wherein at least one coloring ingredient is incorporated into the second section.

18. A method of using at least one coloring agent for providing a visual or optical difference, via color difference, of at least one first section and at least one second section of a hotmelt adhesive body upon processing and applying the hotmelt adhesive body by means of a hotmelt adhesive discharge apparatus,
wherein the first section comprises at least one reactive hotmelt adhesive selected from the group consisting of (i) reactive moisture-crosslinking polyurethanes comprising isocyanate groups, (ii) reactive moisture-crosslinking polyolefins comprising silane groups, (iii) reactive radiation-crosslinking poly(meth)acrylates comprising urethane groups as well as combinations thereof, and
wherein the second section comprises at least one cleaning or purging agent, wherein the second section further comprises at least one additive which deactivates the chemically reactive groups of the reactive hotmelt adhesive, wherein the additive comprises a functional group which reacts with the chemically reactive groups of the reactive hotmelt adhesive and wherein the additive is monofunctional;
wherein the first section and the second section are configured such to be optically different from one another via difference in color from one another, wherein at least one coloring ingredient is incorporated into the second section.

\* \* \* \* \*